Feb. 1, 1966 W. KLINGLER ETAL 3,232,705
PRODUCTION OF PURE CONCENTRATED SULFURIC ACID
Filed Sept. 5, 1962
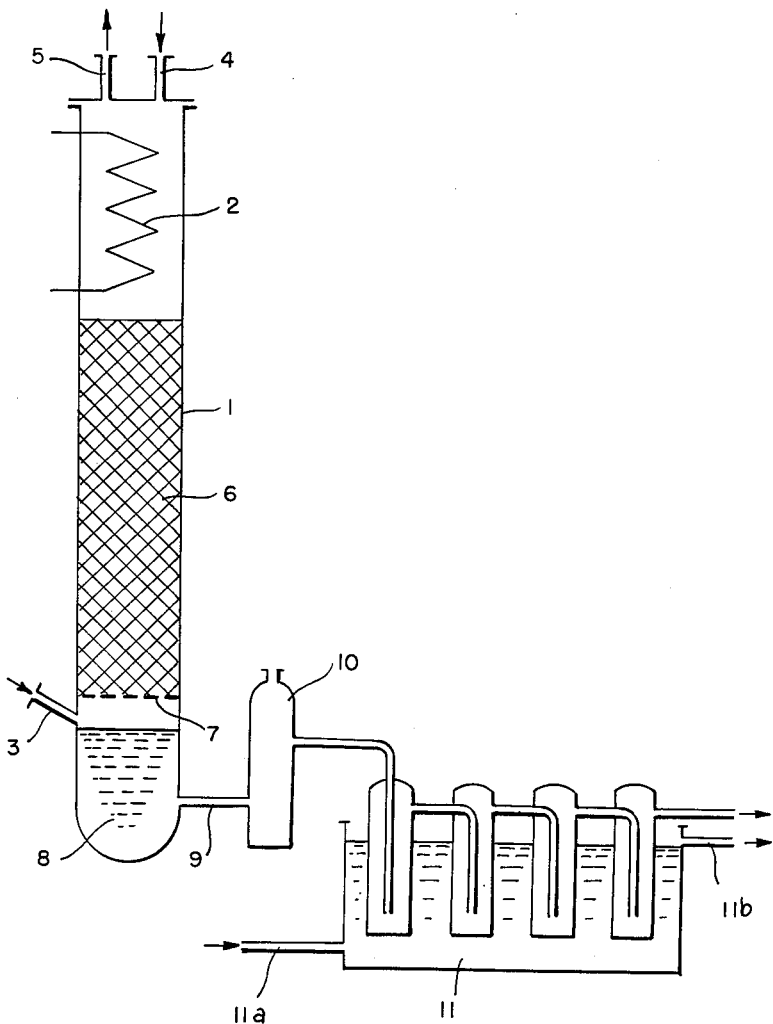
INVENTORS:
WILLI KLINGLER
HERBERT WOLF
BY
ATT'YS

3,232,705
PRODUCTION OF PURE CONCENTRATED SULFURIC ACID

Willi Klingler and Herbert Wolf, Ludwigshafen (Rhine), Germany, assignors to Badische Anilin- & Soda-Fabrik Aktiengesellschaft, Ludwigshafen (Rhine), Germany
Filed Sept. 5, 1962, Ser. No. 221,584
Claims priority, application Germany, Sept. 9, 1961, B 63,957
2 Claims. (Cl. 23—167)

This invention relates to a process for the production of sulfuric acid, especially to a process for the production of pure concentrated sulfuric acid which is free from sulfur dioxide.

In order to obtain chemically pure sulfuric acid which will satisfy the purity requirements of the Deutsche Arzneimittelbuch (German Pharmacopoeia) 6th edition, or the specifications in "Prüfung der chemischen Reagenzien" by E. Merck, Darmstadt, 5th edition, 1939, acid such as is obtained by the sulfuric acid contact process must be subjected to a distillation in quartz apparatus, with or without the use of reduced pressure. It is also known to prepare chemically pure sulfuric acid by allowing distilled water to act on sulfur trioxide, which may be obtained from high percentage oleum by heating, in quartz apparatus and in the presence of about 98% sulfuric acid at temperatures of about 60° to 100° C. This reaction is carried out as a rule in a bed of tower packing through which the 98% sulfuric acid is circulated. It is not possible by this process to obtain with certainty a very pure sulfuric acid. Thus, for example, fibers from sealing material and traces of oil and grease from the pumps may pass into the recycle acid. Furthermore the sulfur trioxide is usually contaminated by sulfur dioxide which is also absorbed into the sulfuric acid. The sulfuric acid may then contain amounts of sulfur dioxide which exceed the value permitted by the above-mentioned purity requirements. Although sulfur dioxide can be substantially removed in a separate operation by passing air through the acid, it is not always possible to avoid traces of solids and oleiferous impurities passing into the sulfuric acid with the air introduced.

It is an object of the present invention to provide a simpler method for the production of concentrated and pure sulfuric acid. It is a further object of the invention to provide a process whereby concentrated sulfuric acid of high purity can be obtained in a single operation by the reaction of sulfur trioxide with water. A still further object of the present invention is to provide a process whereby the sulfuric acid is obtained substantially free of sulfur dioxide.

Further objects and advantages of the present invention will become apparent from the following disclosure and the appended drawing which shows by way of example a diagrammatic view of an apparatus for carrying out the process according to the invention. These objects are achieved by reacting gaseous sulfur trioxide and water in the presence of concentrated sulfuric acid at temperatures near or at the boiling point of sulfuric acid.

Sulfuric acid mist which it is difficult to precipitate and which otherwise usually forms when sulfur trioxide is brought together with water or water vapor, and the formation of which may even proceed with explosive phenomena, does not occur when working in accordance with the present invention.

The vessel in which the reaction is carried out may be provided with external or internal cooling means to remove the heat set free by the reaction of sulfur trioxide with water.

It is particularly advantageous to remove the reaction heat by supplying an amount of water greater than is necessary for the formation of sulfuric acid and by making provision for the excess water to vaporize, a large part of the reaction heat thereby being removed. The remaining reaction heat is removed by the hot sulfuric acid formed. By using an appropriate excess of water, it is possible when working under normal pressure to maintain temperatures of about 320° to 333° C. which have proved to be especially favorable in practice; under standard conditions, the boiling point of the azeotropic mixture of 98.3% sulfuric acid is 333.3° C. The maintenance of the said specific temperature range is however not a characteristic of the process. The process may also be carried out under reduced pressure and correspondingly lower temperatures.

When removal of a portion of the reaction heat is effected by vaporizing excess water, it is advantageous to condense the evaporated water in a reflux condenser and return the condensate into the reaction liquid.

The process according to the invention may be carried out particularly advantageously in a column such as is shown diagrammatically in the accompanying drawing. Parts of the column which come into contact with sulfuric acid are made of or lined with a material which will withstand the attack of boiling sulfuric acid, such as quartz or noble metals. A quartz reflux condenser 2 is arranged in the upper part of column 1. Gaseous sulfur trioxide is introduced through a pipe 3 and distilled or condensed water through a pipe 4. In the central portion of the column 1, a bed of tower packing 6 is provided which rests on a perforated plate 7. Within this bed, a zone of boiling sulfuric acid forms at a certain height which depends on the amounts of reactants supplied to the column. Gaseous sulfur trioxide flows upwardly into the said zone and water flows downwardly into it in excess. Within the said zone, gaseous sulfur trioxide combines with water to form boiling sulfuric acid without mist formation, the excess of water immediately vaporizing and removing the bulk of the reaction heat. Any sulfur dioxide introduced with the sulfur trioxide is insoluble in the concentrated acid at the boiling temperature and leaves the reaction zone with the stream of steam and leaves the column through a pipe 5. In order to remove the steam and the sulfur dioxide more rapidly, small amounts, i.e., up to about 10% by volume, especially 1 up to 5% by volume, of an inert gas, i.e., a gas which will not react with the reaction components, for example, air or nitrogen, may be mixed with the sulfur trioxide. The bulk of the steam together with any sulfuric acid vaporized is precipitated in the reflux condenser 2 whence the water returns to the reaction zone. The gas leaving the column consists merely of sulfur dioxide saturated with steam and some air or nitrogen.

The sulfuric acid formed flows down at a temperature slightly below its boiling point into a collecting chamber 8 and passes through a pipe 9 to a deaerator 10 and then is supplied to a cooler 11 having an inlet tube 11a and an outlet tube 11b for cooling water, the acid thus being cooled down to a temperature sufficiently low for further processing or transportation. The amount of water supplied through the pipe 4 is regulated so that it is sufficient for the reaction of sulfur trioxide to sulfuric acid and also to cover the loss which escapes through the pipe 5 with the sulfur dioxide.

The amount of the excess of water which is recycled in the cloumn depends on the amount of sulfur trioxide being reacted and on the temperature at which it is introduced into the column; it is also dependent on the size of the column, the volume occupied by the tower packing and the amount of inert gas added. It can be calculated on the basis of the heat of formation of sulfuric acid from sulfur trioxide and water and the heat of vaporization of water and the temperature of the sulfuric acid withdrawn. When operating the process commercially, about 35% of the heat of reaction is removed with the hot effluent sulfuric acid and about 65% by vaporization of the excess water.

The following example illustrates, but does not limit, the invention.

*Example*

Referring to the drawing, 130 kg. per hour of sulfur trioxide at a temperature of 60° C. is passed through pipe 3 into the column 1 of quartz glass having a height of 350 cm. and a diameter of 20 cm. 36 liters of condensed water at a temperature of 25° C. is introduced per hour through pipe 4. A reaction zone of boiling sulfuric acid, about 5 cm. in height, in which temperatures up to about 333° C. prevail, forms within the bed of tower packing 6. A few centimeters above this zone, a temperature of only 100° C. is measured. The sulfuric acid formed flows out of the reaction zone at a temperature of about 300° C. The excess amount of water necessary for cooling, which must be introduced into the column at the beginning of the reaction, is about 5 liters. 165 kg. per hour of 97% sulfuric acid is withdrawn through the pipe 9. After the sulfuric acid has been cooled, it may be brought to the commercial concentration of 96% by dilution with distilled water. Without any further treatment, the acid satisfies the purity requirements given above.

We claim:

1. A process for the production of pure concentrated sulfuric acid substantially free from sulfur dioxide which consists essentially of introducing sulfur trioxide and up to 10% by volume of a second gas, said second gas being inert, into the lower portion of a cylindrical vertical reaction zone, the central portion of said reaction zone consisting of a plurality of communicating smaller zones, introducing water into the upper portion of the reaction zone whereby a layer of concentrated boiling sulfuric acid is formed in the central portion of the reaction zone, removing the reaction heat not withdrawn with the exit acid by supplying an excess of water over the amount necessary for the formation of sulfuric acid, vaporizing the excess water, condensing the vaporized excess of water at the top of said reaction zone, returning the condensate to the layer of boiling sulfuric acid and withdrawing the concentrated sulfuric acid formed from the lower portion of the reaction zone.

2. A process as claimed in claim 1 wherein the concentration of the boiling sulfuric acid is from 97 to 98.3% by weight.

References Cited by the Examiner
UNITED STATES PATENTS

| | | | |
|---|---|---|---|
| 2,655,431 | 10/1953 | Allen et al. | 23—168 |
| 2,730,431 | 1/1956 | Haltmeier | 23—167 |
| 2,785,961 | 3/1957 | Carter | 23—283 |
| 2,819,947 | 1/1958 | Stahl | 23—167 |
| 2,950,180 | 8/1960 | Kunzer et al. | 23—283 |

MAURICE A. BRINDISI, *Primary Examiner.*